Figures 6, 7:
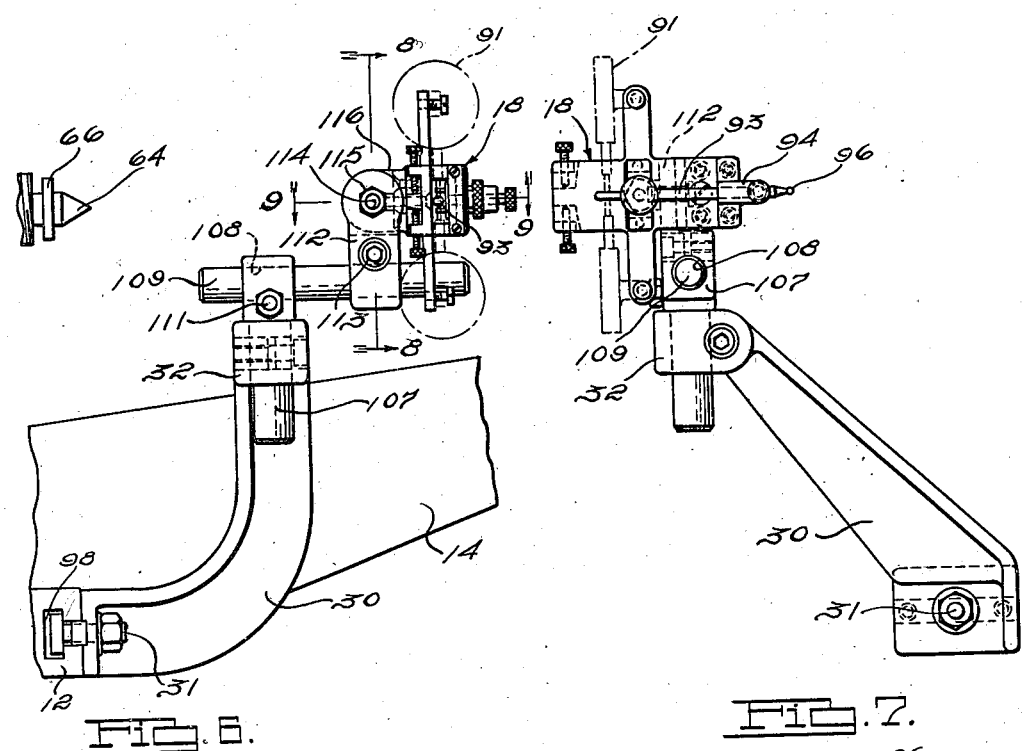

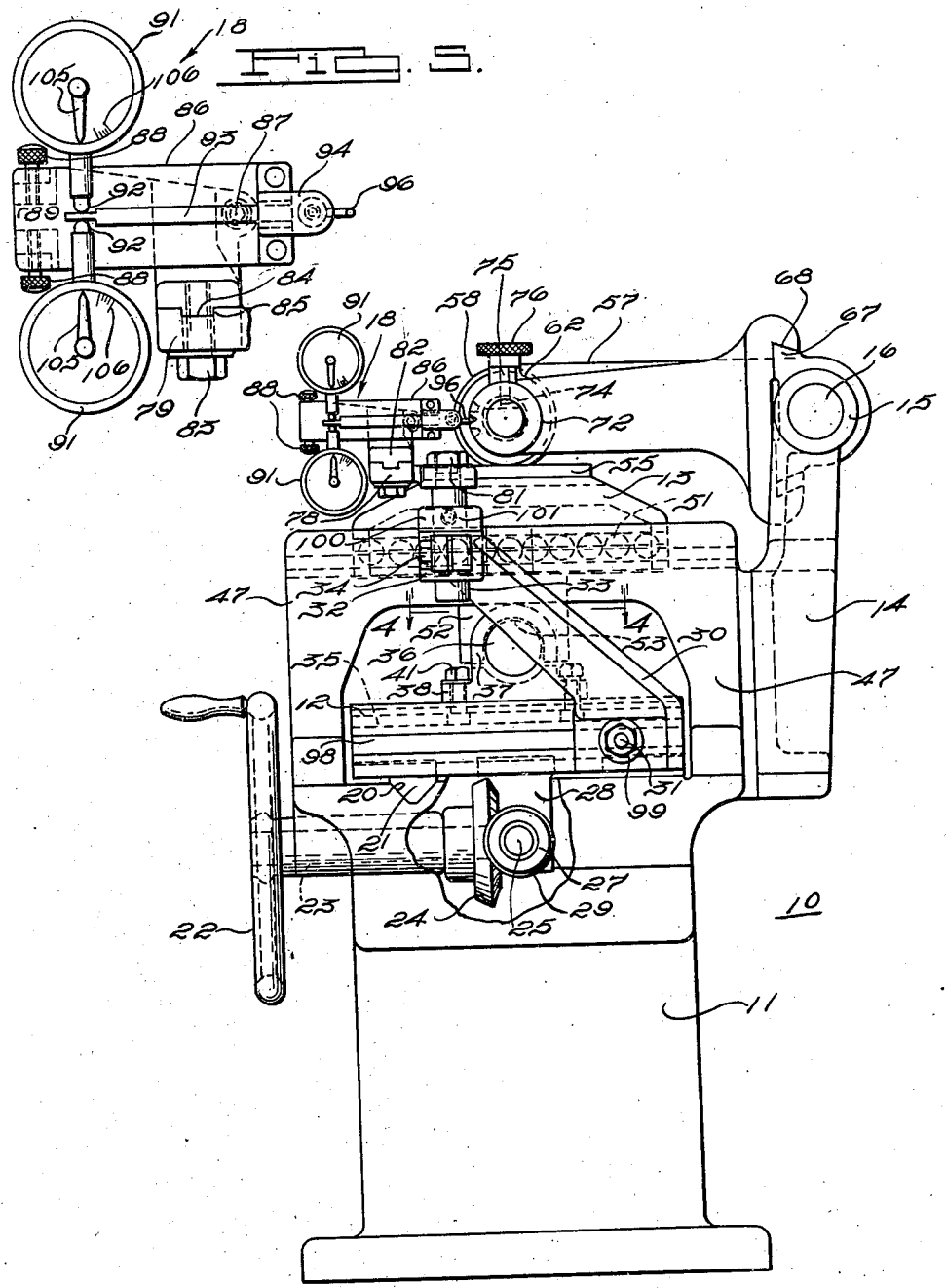

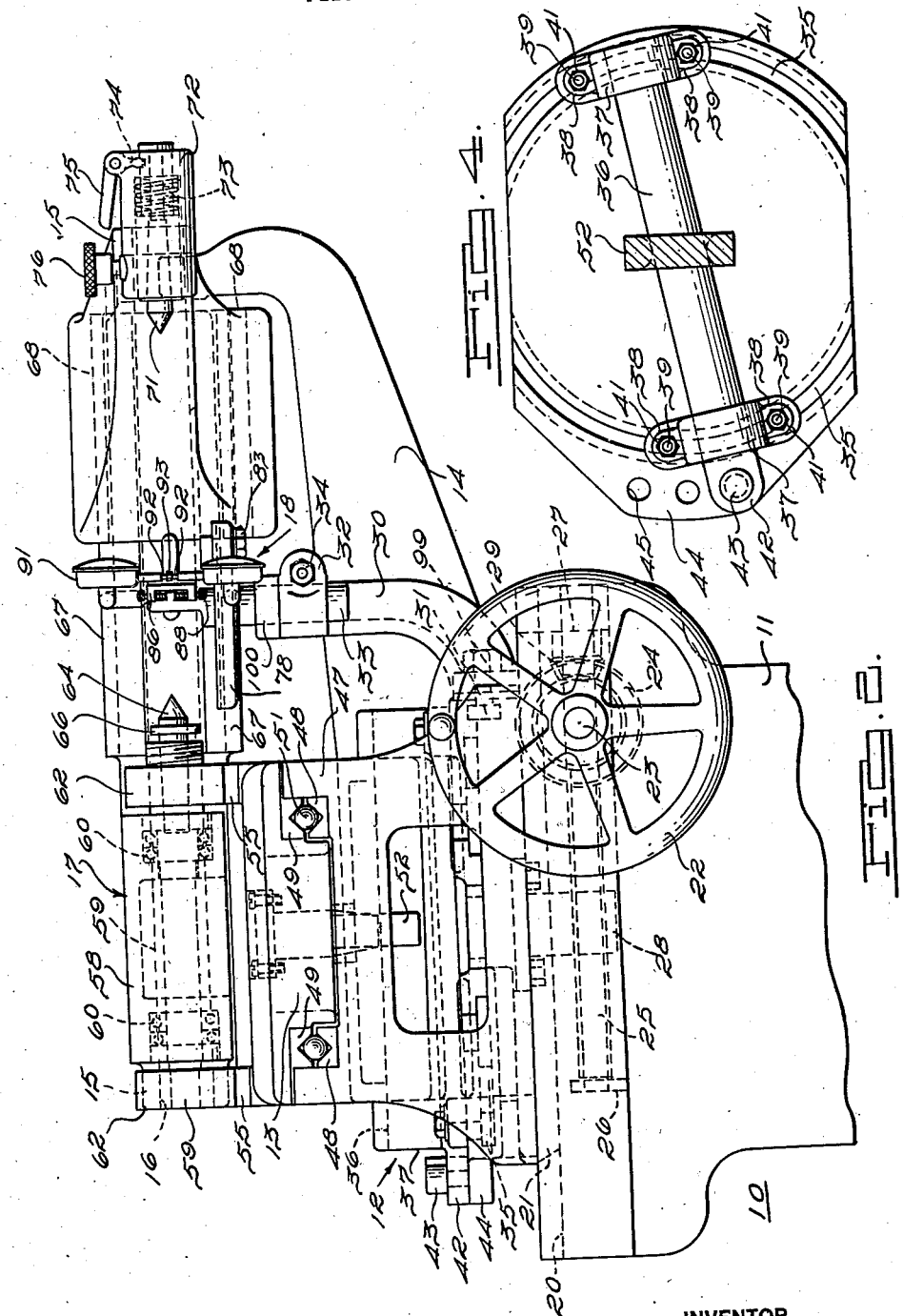

July 7, 1936.　　　J. C. DRADER　　　2,046,506
LEAD TESTING MACHINE FOR SPIRAL GEARS
Filed Nov. 16, 1931　　　5 Sheets-Sheet 3
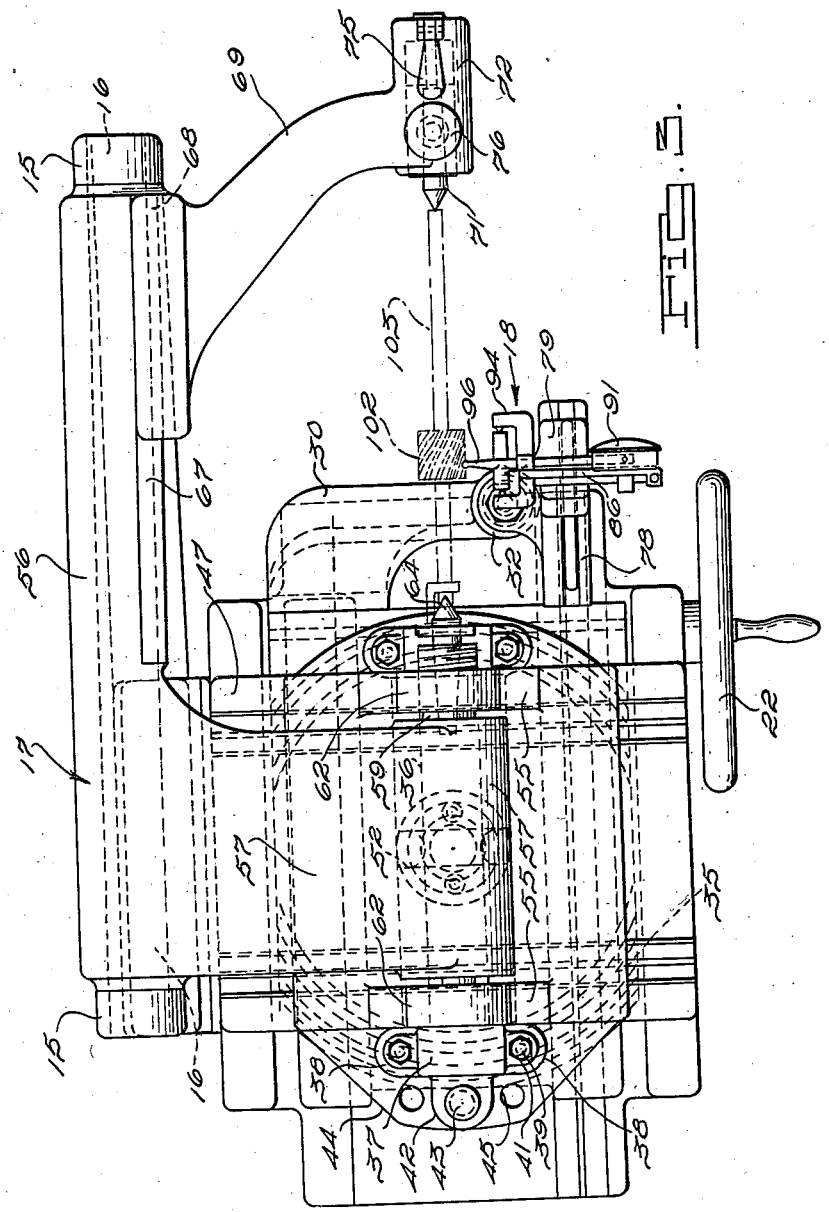
INVENTOR
Joseph C. Drader.
BY
Harness, Dickey, Pierce & Mann.
ATTORNEYS July 7, 1936.  J. C. DRADER  2,046,506
LEAD TESTING MACHINE FOR SPIRAL GEARS
Filed Nov. 16, 1931  5 Sheets-Sheet 4

INVENTOR
Joseph C. Drader.
BY
ATTORNEYS

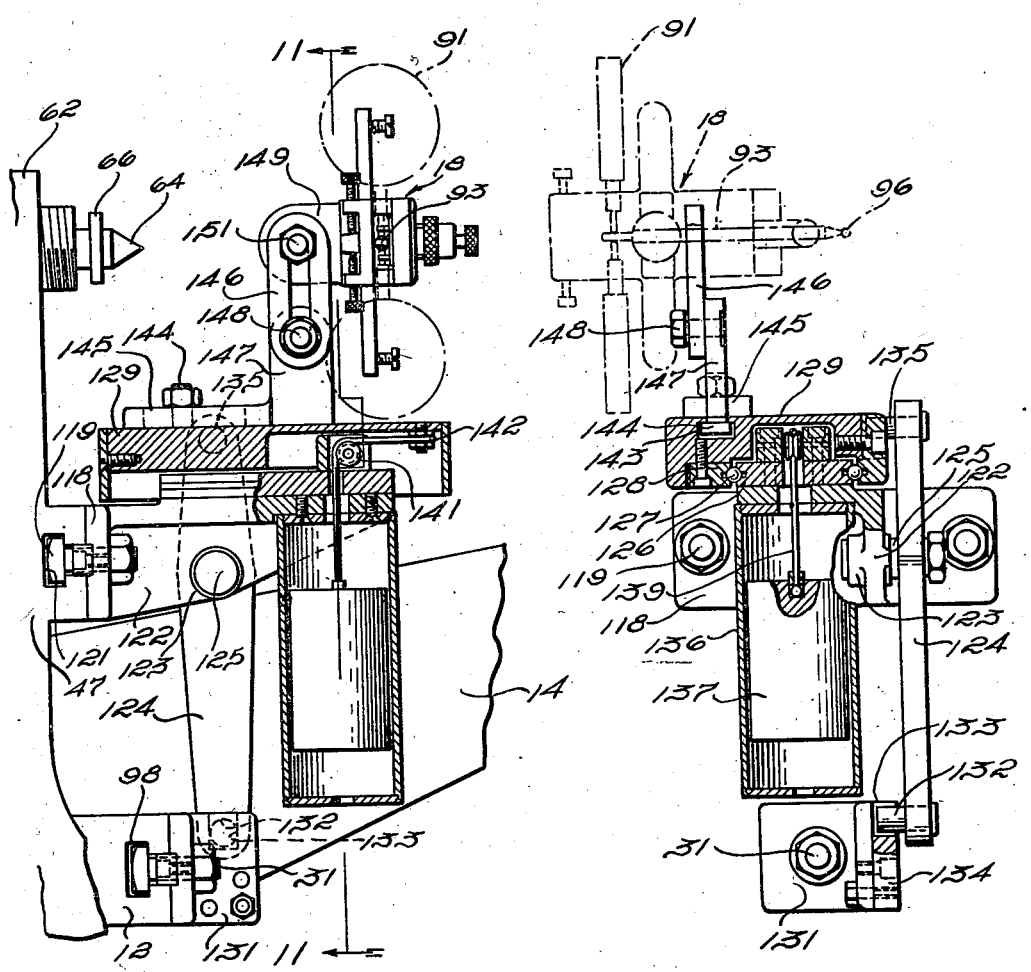

Patented July 7, 1936

2,046,506

UNITED STATES PATENT OFFICE 2,046,506

LEAD TESTING MACHINE FOR SPIRAL GEARS

Joseph C. Drader, Detroit, Mich., assignor, by mesne assignments, to Michigan Tool Company, a corporation of Delaware Application November 16, 1931, Serial No. 575,195

14 Claims. (Cl. 33—174)

This invention relates to machine tools and particularly to a machine for checking the accuracy of articles having spiral threads, cutting teeth, or other projections having a helical lead, such for example, as gears, cutters, and the like.

In Patent No. 1,898,084, granted February 21, 1933 on my co-pending application, Serial number 232,226, filed November 10, 1927, and assigned to the assignee of the present invention, I have described and claimed a machine of the above mentioned type wherein the article to be tested was rotated in relation to the longitudinal movement of an instrument which checked the accuracy of the spiral gears or hobs having a sharp lead angle. Difficulty heretofore experienced with machines of this type, when endeavoring to obtain the related movement of the article and the checking instrument by a lead screw and/or a train of gears, was overcome by the structure of the above noted co-pending application through the employment of an accurately constructed rack which eliminated any play in the driving mechanism which effected the rotation of the article and the longitudinal movement of the checking instrument.

In practicing my invention, I am able to effect the related rotational and longitudinal movement between the article and the checking instrument independent of the means employed to drive the various elements of the machine and for this reason any type of driving mechanism, such as a lead screw, may be utilized irrespective of the amount of back lash effected thereby, since the relation between the rotation of the article and the longitudinal movement of the checking instrument is entirely independent of the driving means.

The main objects of my invention are—to provide an improved machine for checking the accuracy of the spiral lead of an element, which is extremely accurate and simple in construction and operation; to provide an improved machine wherein relative rotational and longitudinal movement between an article and an indicating instrument is effected independent of the actuating mechanism which may be employed for producing the movement; to provide driving means between two angularly movable tables which is adjustable to regulate the degree of movement therebetween, to interconnect the driven table with the support for the work to effect its rotation; and in general, to provide a lead testing machine which is extremely accurate, simple in operation and economical of manufacture.

Figures 8, 9:
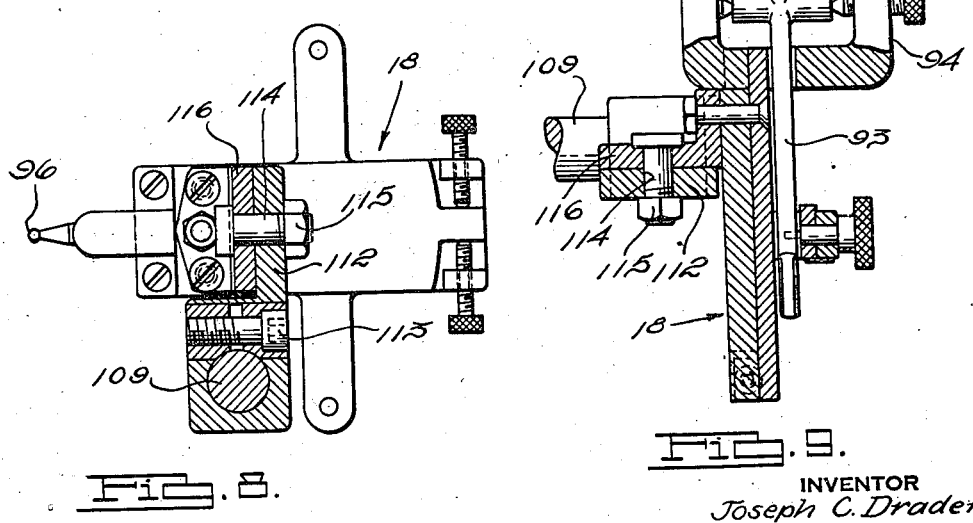

Other objects and features of novelty of the invention will be either specifically pointed out or will become apparent when referring, for a better understanding of my invention, to the following description in conjunction with the accompanying drawings, wherein:

Figure 1 is a view, in end elevation, of a lead testing machine embodying features of my invention, Fig. 2 is an enlarged broken view, in side elevation, of the machine illustrated in Fig. 1, Fig. 3 is a plan view of the structure illustrated in Fig. 2, Fig. 4 is a sectional view of the structure illustrated in Fig. 1, taken on the line 4—4 thereof;

Fig. 5 is an enlarged view of the indicating device illustrated in Figs. 1, 2, and 3, Fig. 6 is a broken view, in elevation, of a supporting arm and attachment for the indicating device illustrated in Fig. 5 showing a modified form thereof, Fig. 7 is an end view of the structure illustrated in Fig. 6, Fig. 8 is a sectional view of the structure illustrated in Fig. 6, taken on the line 8—8 thereof, Fig. 9 is a sectional view of the structure illustrated in Fig. 6, taken on the line 9—9 thereof, Fig. 10 is a sectional view of a further modified supporting structure for supporting the indicating device illustrated in Fig. 5, and Fig. 11 is a sectional view of the structure illustrated in Fig. 10, taken on the line 11—11 thereof.

My invention comprises in general a machine 10, which includes a base 11, upon which carriages 12 and 13 are mounted for relative movements laterally of each other. The base 11 has a rearwardly and laterally extending portion 14 which is further extended upwardly at each end to constitute bearings 15 which support a shaft 16 upon which a work supporting member 17 is mounted. The work supporting member 17 is mounted to have the work supporting portion so related with the carriage 13 as to revolve the work in relation to the longitudinal movement of a tool or an indicating mechanism 18 which is associated with the carriage 12.

A guide slot 20 is provided in the upper surface of the base 11 in which a rail 21, on the underside of the carriage 12, registers for guiding the movement of the carriage to the right or left as viewed in Fig. 2. A hand wheel 22 is supported on the front of the base member, on a shaft 23 which extends to within the inner hollow surface of the base. Upon the inner end of the shaft 23 a beveled gear 24 is supported in fixed relation thereto for rotation with the hand wheel 22.

A lead screw 25 is supported on the base 11 by brackets 26 and 27 in longitudinal relation to the table 12, from the underside of which a threaded projecting portion 28 is provided in engagement with the thread of the lead screw 25. A bevel gear 29 is mounted in fixed relation to the lead screw 25, in mesh with the bevel gear 24, for the purpose of transferring the rotation of the hand wheel 22 and the shaft 23 to the lead screw 25. The rotation of the lead screw 25 causes the threaded portion 28, associated therewith, to move the table 12 relative to the movement of the hand wheel 22.

An arm 30 is attached to the carriage 12 by a bolt 31, said arm extending upwardly therefrom to form a split boss 32 having an aperture through which the supporting arm 33 of the indicating mechanism 18 projects and which is clamped in firm relation to the arm 30 by a bolt 34 which draws the sides of the boss into firm relation with the surface of the arm 33.

The upper surface of the carriage 12 is provided with arcuate T-shaped slots 35 which are struck on a radius from a point disposed centrally of the carriage. A bar 36 which has been designated in my above-mentioned co-pending application, and which will be referred to hereinafter as a "sine bar" is mounted on the top surface of the carriage by supporting bosses 37. The bosses engage the ends of the bar and are provided with feet 38 having bolts 39 extending therethrough in such manner that the heads of the bolts register in the T-slot 35 provided in the carriage. Nuts 41 are screwed upon the projecting ends of the bolts for clamping the feet 38 into firm relation with the top surface of the carriage.

This construction permits the adjustment of the sine bar 36 to any predetermined angle relative to the movement of the carriage 12 for a purpose which will be explained fully hereinafter. In order to effect this angular adjustment of the sine bar, I have provided an extension 42 on one of the brackets 37 and have mounted a positioning pin 43 therein for aiding the accurate setting of the sine bar. A flange 44 projects from the carriage 12 adjacent to the projection 42 and is provided with a plurality of apertures 45 for the purpose of receiving pins which may be provided with extending arms of predetermined dimensions, which are engageable by the head of the pin 43 to position the sine bar in a predetermined angular position on the carriage.

The pins having the extending arms, are employed when a plurality of predetermined settings are repeatedly utilized, and when any other setting is desired, a pin may be provided in an aperture 45 having a head of known diameter, between the surface of which and the head of the pin 43 the angular disposition of the sine bar may be accurately set off. The apertures are provided on the center line and at predetermined distances either side thereof to facilitate the measuring of the angle to effect the disposition of the sine bar on either side of a center line through the carriage.

A frame member 47 straddles the carriage 12 and extends upwardly from the base 11 for the purpose of supporting raceways 48 which are disposed laterally of the rail 21 of the carriage 12. The carriage 13 is provided with raceways 49 which are mated with the raceways 48, between which a plurality of balls 51 are mounted upon which the carriage 13 rolls. To effect the movement of the carriage 13, a downwardly extending bracket 52 projects from the underside thereof into intimate engagement with the sine bar 36. A recess 53 is provided in the bottom end of the projecting member 52 to receive the sine bar, the side edges of the recess being of arcuate shape, as shown in Fig. 3, for permitting the angular adjustment of the sine bar relative to the projecting member 52.

As the sine bar is moved to the right or left with the carriage 12, the angular disposition of the bar causes the frontwardly or rearwardly movement of the carriage 13, an amount which is proportional to the angular disposition of the bar relative to the path of movement of the carriage 12. A pair of rails 55 are mounted at the edges of the top surface of the carriage 13 in parallel relation to the raceways 48 and 49 and have their top surfaces very accurately machined relative to each other throughout their length.

The work supporting member 17 is provided with a shaft engaging portion 56 of such length as to fit between the bosses 15. A frontwardly portion 57 extends from the member 56 and terminates in a hollow sleeve 58 through which a rotatable shaft 59 extends and is supported for rotational movement within the sleeve 58 by bearings 60. A pair of accurately machined rolls or wheels 62 are mounted in fixed relation to the shaft 59 adjacent to each end of the sleeve 58. The rolls or wheels 62 may be made entirely of friction material or may have a friction material provided on the outer surface in engagement with the surface of the rail 55.

The right hand end of the shaft 59, as viewed in Fig. 2, is provided with a tapered aperture or other well known expedient for supporting a work centering pin 64 or a work supporting arbor (not shown). The arbor or the center pin is, in this manner, mounted in fixed relation to the shaft 59 to rotate along therewith. An arm 66 extends from the sides of the centering pin 64 for the purpose of engaging an arm on a dog attached to the shaft employed for supporting the work piece, for the purpose of rotating the work piece along with the centering spindle.

The inner surface of the shaft engaging portions 56 of the work supporting member 17, is provided with a pair of rails 67 which are engaged by the dovetailed slot 68 provided on the end of an arm 69 which supports a centering spindle 71 in alignment with the centering spindle 64. The centering spindle is mounted in a boss 72 which is biased into engagement with the supporting shaft for the work piece, by a spring 73 which is withdrawn therefrom by a cam 74 operated by a handle 75. A thumb nut 76 is employed for clamping the spindle 71 in any of its positions. The engagement between the dovetailed slot 68 and the rails 67 permits the adjustment of the arm 69 to receive work pieces of considerable length.

The weight of the arm 69 and the arm 57, effects a considerable moment about the shaft 16 which causes the surface of the rolls or wheels 62 to be pressed into firm engagement with the surface of the rails 55. As the carriage 13 is moved frontwardly or rearwardly, the rolls or wheels 62 are revolved thereby to cause the shaft 59 to be rotated in one or the other direction. This causes a predetermined relation to exist between the rotation of the shaft 59 and the longitudinal movement of the arm 30 because of the relative movement of the tables 13 and 12. Since the relative movement between the two carriages 12 and 13 may be changed, by changing the angle of the sine bar 36, it is very apparent that the relation between the rotation of the shaft 59 and the longitudinal movement of the arm 30 may likewise be relatively changed in accordance with the helical lead of the work piece.

While it is to be understood that my machine tool thus far described may be employed for any number of purposes where extreme accuracy is desired when operating on a work piece relative to its radial and longitudinal dimensions, I have illustrated one desirable utility of the machine, that of checking the accuracy of the spiral lead of a thread provided on the surface of a work piece.

The indicating device 18, which is employed with the machine herein described, includes the supporting arm 33 hereinabove mentioned which may be clamped by the split boss 32 and the nut 34 in fixed predetermined relation to the arm 30. A slotted bar 78 is provided with a boss 79 which is supported by a bolt 81 on the top of the arm 33 and which in turn supports the supporting portion 82 of the indicating mechanism 18. A bolt 83 extends through the slot of the member 78 and a tongue 84 and groove 85 in the members 82 and 78, respectively, guide the member 82 as it is moved along the member 78 into a predetermined position in which it is clamped by a bolt 83.

A gauge supporting plate 86 is pivoted by a pin 87 to the member 82, which is adjustable about the pin 87 through the adjustment of the thumb screws 88 which engages a tenon 89 projecting from the rear portion of the member 82. A pair of gauges 91 are mounted on the member 86 in oppositely disposed aligned engagement to each other, having the actuating plungers 92 thereof engaging the opposite sides of a multiplying bar 93 which is pivoted between a pair of arms 94 provided on the inner end of the plate 86. Projecting inwardly from the pivot, the bar 93 is extended and united with a ball shaped end 96 which engages the side of a tooth, slot or similar projection or indentation having a spiral lead, the accuracy of which is to be measured. A slot 98 of T-shape is provided on the edge of the carriage 12 in which the head of the bolt 31 is recessed and which is slidable along the slot for the purpose of adjusting the arm 30 relative to the diameter of the work piece. After the arm has been so adjusted a nut 99 may then be rotated to clamped position for retaining the arm in fixed position. A collar 100 is provided on the arm 33, having a set screw 101 therein, for the purpose of adjusting the vertical position of the arm 33 relative to the arm 30 and the work piece.

The operation of my machine will now be described. Assume a work piece 102 is mounted, by means of a shaft 103 or a stub-arbor (not shown), in rotatable relation to the shaft 59, and that the arm 30 has been adjusted relative to the carriage 12 to have the ball end 96 of the multiplying lever 93 in rubbing relation to the underside of a thread of the work piece 102. The gauge 91 is set to have its indicating arm 105 directed to the zero point of the scales 106. The hand wheel 22 is then rotated to have the carriage 12 and, therefore, the arm 30 and the checking mechanisms 18 move parallel to the element to be gauged.

It is to be understood that the sine bar 36 has been adjusted relative to the spiral lead provided on the work to have the carriage 13 move laterally with respect to the movement of the carriage 12 for the purpose of rotating the shaft 59 and, therefore, the work piece 102 in timed relation to the lateral movement of the checking device 18.

As the work piece 102 is rotated, the surface engaged by the ball end 96, as it moves laterally across the work piece should, if the work is accurate and the machine properly adjusted, engage the ball in the same horizontal plane. When this occurs no vertical movement of the ball is effected and the arms 105 of the gauges remain directed to the zero point of the scale. When inaccuracy in the spiral lead is present in the work piece, the ball 96 will be deflected vertically by an amount proportional to the inaccuracy of the lead which will be multiplied by the lever 93 to effect a large movement of the indicating arms 105 over the scale 106. After one tooth has been checked in this manner, the arms 69 and 57 are then raised about the shaft 16, to disengage the wheels 62 from the surface of the rails 55 so that the work piece 102 may be adjusted to have an adjacent tooth brought into engagement with the ball 96 to have the checking thereof effected in a like manner.

Referring to Figs. 6 to 9 inclusive, I have illustrated a modified form of retaining arm and element for supporting the indicating device in such manner as to have the device tiltable in all directions. The purpose of this construction is to permit the ball end 96 of the lever 93 to engage the thread or tooth in such manner as to have the plane in which the lever 93 oscillates to be substantially at right angles to a tangent to the slope thereof. The arm 30 has a pin 107 extending through the split boss 32 thereof and is provided with an eye or aperture 108 through which a rod 109 extends to be clamped therein by a screw 111 which draws the sides of the split end of the pin 107 together, tightly about the rod 109. A bracket 112 is mounted to slide upon the rod 109 and to be clamped thereto in any predetermined position by a bolt 113 which draws the parts of the bracket together about the rod. The upper end of the bracket is provided with an aperture 114 through which a bolt 115 extends to engage an apertured arm 116 provided on the indicating device 18.

In this construction it will be noted that the indicating device 18 is revolvable about the bolt 115 in one plane and that the bracket 112 is revolvable about the rod 109 in a plane 90 degrees thereto and that the pin 107 is revolvable relative to the bushing 32 to provide a movement for the device 18 in a third plane. It will also be noted that the device 18 is adjustable on the rod 109 which is also adjustable longitudinally of its length relative to the pin 107. In this construction it will be very apparent that substantially any adjustment of the device 18 may be made to position it at any angle or in any plane. When the thread or tooth of a gear is provided with a sharp lead, the device 18 may be tilted about the pin 115 to have the plane through the path of movement of the lever 93 substantially at right angles to the thread so that any variations thereof may be noted on the index scale of the device. Any other adjustment necessary to bring the ball point 96 in predetermined engagement with the side of the tooth or thread, may be made through the adjustment of the pin 107, the rod 109 and the bracket 112 as has been pointed out hereinabove.

Referring to Figs. 10 and 11 I have shown a further modified form of supporting arm for the indicating device 18 which may be used on gears to be tested, the teeth of which have extremely sharp lead angles. It is very apparent that when sharp lead angle teeth are to be tested the longitudinal movement of the indicating device relative to the rotation of the gear should be reduced and the structure illustrated in Figs. 10 and 11 is provided for this purpose. An auxiliary table 118 is attached to the frame 47 by bolts 119 which are adjustably retained in the T slots 121 provided in the end of the frame 47 parallel to the T slots 98 in the carriage 12. The bracket is provided with an arm 122 for bracing the table and for providing a boss 123 to which a lever 124 is attached by a pivot 125. The upper surface of the table is provided with raceways 126 having balls 127 contained therein by the complementary raceways 128 supported on the under surface of a movable platform 129. A bracket 131 is supported on the movable carriage 12 by a bolt 31.

The lower end of the lever 124 is provided with a pin 132 which is recessed in a slot 133 in a plate 134 supported on one web of the bracket 131. The upper end of the lever 124 is pivoted by a pin 135 to the platform 129, the distance between the pivot 125 and pin 135 being substantially one-half of the distance between the pivot 125 and the pin 132. In this construction when the carriage 12 is moved, the lever 124 is rocked about the pin 125 to thereby move the platform 129 one-half of the distance of movement of the carriage 12.

A cylinder 136 is provided on the other side of the table 118 in which a weight 137 is suspended on a cable 139 which extends over a pulley 141 and is attached to the under side of the platform 129 at 142. The purpose of the weight is to take up the slack in the pins of the lever 124, the carriage 12 and platform 129, to thereby provide for the accurate movement of the platform relative to the movement of the carriage by eliminating the backlash from between the moving elements.

A T slot 143 is provided on the top of the platform 129 in which a bolt 144 is slidably retained for securing an L-shaped bracket 145 on the platform. A slotted link 146 is supported on the upwardly extending arm 147 of the bracket 145 and is secured thereto by a bolt 148. The upper end of the link 146 receives an arm 149 of the indicating device 18 which is secured to the link by a bolt 151. In this construction, the indicating device 18 may be revolved about the bolt 151 or about the bolt 148 or both so as to position the ball end 96 relative to the thread or tooth in such manner as to have the lever 93 so related to the thread as to have the plane through which the lever moves, positioned substantially 90 degrees to the thread.

When so mounted, any irregularity in the surface of the thread will be magnified by the indicating device to a greater extent than if the plane of movement of the arm were disposed at an angle to the thread which has been the practice heretofore. It will be further noted that the rotation of the gear relative to the movement of the indicating device will be twice that of the rotation of the gear and movement of the device, when the structure shown in Figs. 1 to 9 inclusive is employed, that is to say, when the indicating device is carried directly by the carriage 12. When any of the structures herein illustrated and described are employed, exceedingly accurate checking of the curvature of the surfaces on a work piece results without requiring a skilled operator or the expenditure of time and labor in setting up the work piece and testing the accuracy of its surfaces.

It is to be understood that the testing of the helical lead may be effected during the movement of the table 12 in either direction, since the opposite rotation of the work piece 102 will occur because of the reverse lateral movement of the table 13 with respect to the movement of the table 12. The operation of my machine in both directions is made possible since the play in the lead screw 25 has no influence on the related movement in rotation of the work piece relative to the longitudinal movement of the checking device. The relation between the work piece and the checking device remains the same in either direction of movement of the carriage 12 because no play is present between the sine bar, the projecting member on the carriage 13 which engages the sine bar, or between the rails of the carriage 13 and the wheels 62 for rotating the work piece.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim:

1. In a machine of the class described, a base having a carriage movable thereon and provided with an extension, an arm adjustably supported on said carriage, a tool adjustably supported on said arm, a sine bar adjustably carried by said carriage, a second carriage movable laterally of the direction of movement of said first carriage, having means for slidably engaging said sine bar, rails on said second carriage, a support for a work piece rotatably mounted on said extension of said base, and friction wheels engaging said rails and operatively connected to said work piece support.

2. In a machine of the class described, a base having a carriage movable thereon and provided with an extension, a tool carrying arm adjustably supported on said carriage, a second carriage movable laterally of the direction of movement of said first carriage and provided with rails, means interconnecting said carriages for effecting their relative movement, a support for a work piece rotatably mounted on said extension of said base and friction wheels engaging said rails operatively connected to said work piece support.

3. A machine having a base comprising two sets of guide rails which are disposed angularly relative to each other in different parallel planes, a base for supporting said rails, carriages mounted on said rails, a tool supporting arm adjustably mounted on one of said carriages, means for moving said carriage, an adjustable means on said carriage for moving said other carriage angularly with respect to the movement of said first carriage during its actuation, a work piece supporting member rotatably supported on said base, and interconnecting means including rollers between said second carriage and said work piece support member for effecting its rotation upon movement of said second carriage.

4. A machine for testing the accuracy of curved projections of work pieces including, in combination, a movable carriage, indicating means carried thereby, a carriage movable in angular relation to said first carriage, driving means between said carriages, a work supporting spindle, and rollers engaging said second carriage and driven by the movement thereof for driving said spindle relative to the movement of said first mentioned carriage.

5. A machine for testing the accuracy of curved surfaces of work pieces including, in combination, a movable carriage, indicating means carried thereby, a carriage movable at right angles to said first carriage, adjustable driving means between said carriages for regulating the relative movement therebetween, a work supporting spindle, and means including rollers engaging said second carriage and driven by the movement thereof for driving said spindle in timed relation to the movement of said first carriage.

6. A machine for testing the accuracy of curved surfaces of work pieces including, in combination, a movable carriage, indicating means carried thereby, a carriage movable in angular relation to the movement of said first carriage, driving means between said carriages, a work supporting spindle, and rollers in connection with said spindle and in contact with said second carriage for effecting the rotation of the work relative to the movement of the second mentioned carriage.

7. A machine for testing the accuracy of curved surfaces of work pieces, including, in combination, two carriages movable in angular relation to each other, a rotatable support for the work piece, rollers associated with said support for engagement with one of said carriages for effecting the rotation of the work piece relative to the movement of the carriage, indicating means carried by the other carriage, and interconnecting means between the carriages for effecting their relative angular movement in accordance with the lead of the surface to be tested.

8. A machine for testing the accuracy of curved surfaces of work pieces including, in combination, a movable carriage, indicating means carried thereby, a carriage movable at right angles to the direction of movement of said first carriage, adjustable means interconnecting said carriages and adjustable for regulating the relative movement therebetween, a rotatable support for a work piece, a roller associated with said support, and a track provided on said second carriage in engagement with said roller for rotating the work piece relative to the movement of the indicating means.

9. A machine for testing the accuracy of curved surfaces of work pieces including, in combination, a base, a first table movable relative thereto, driving means for said first table, a second table movable in angular relation to the path of movement of said first table, adjustable means carried by one of said tables for effecting the relative speed of movement of the other table, a third table movable in the direction of movement of said first table, means between said first and third tables effecting an unequal displacement of said third table simultaneous with and proportional to the displacement of said first table, indicating means supported on said third table and in contact with a work piece, and means for supporting and rotating said work piece in timed relation with the movement of said indicating means.

10. A machine for testing the accuracy of curved surfaces of work pieces including, in combination, a base, a first table movable relative thereto, driving means for said first table, a second table movable in angular relation to the path of movement of said first table, adjustable means carried by one table for effecting the angular movement of the second table, means actuated by the movement of said second table for rotating a work piece in timed relation to the movement of the first table, a third table actuated by the movement of said first table at a speed which is predetermined relative to the movement of said first table, and an indicating device carried by said third table which moves in contact with said work piece.

11. In a precision machine for testing curved surfaces of work pieces including, in combination, a base, two tables mounted on said base disposed for movement in angular relation to each other, friction means between said tables for effecting their positive movement in synchronism, a rotatable work support, means frictionally engaging and driven by one of said tables for rotating said work support, indicating means carried by said other table, and means for driving one of said tables.

12. A machine for testing the accuracy of curved surfaces of work pieces, including, in combination, a base for said machine, a first carriage movably supported on said base, a second carriage supported on said base and movable in angular relation to said first carriage, adjustable driving means between said carriages for effecting relative movement therebetween, indicating means carried by said first carriage, a work supporting spindle rotatably supported on said base, and means including rollers engaging said second carriage for rotating said spindle in timed relation to the movement of said second carriage.

13. A machine for testing the accuracy of curved surfaces on work pieces, including, in combination, a base for said machine, a first carriage movably supported on said base, a second carriage supported on said base and movable in angular relation to said first carriage, adjustable driving means between said carriages for effecting relative movement therebetween, indicating means carried by said first carriage, a work supporting spindle, and means including rollers engaging said second carriage for rotating said spindle in timed relation to the movement of said second carriage.

14. A machine for testing the accuracy of curved surfaces of work pieces, including, in combination, a base for said machine, a first carriage, a second carriage movable in angular relation to said first carriage, adjustable driving means between said carriages for effecting relative movement therebetween, indicating means carried by said first carriage, a work supporting spindle rotatably supported on said base, and means including rollers engaging said second carriage for rotating said spindle in timed relation to the movement of said second carriage.

JOSEPH C. DRADER.